(12) United States Patent
Sanilevici et al.

(10) Patent No.: US 7,375,827 B2
(45) Date of Patent: May 20, 2008

(54) DIGITIZATION OF UNDERCUT SURFACES USING NON-CONTACT SENSORS

(75) Inventors: Karol Sanilevici, Jerusalem (IL); Gregory Agronik, Jerusalem (IL)

(73) Assignee: Optimet, Optical Metrology Ltd., Jerusalem (IL)

( * ) Notice: Subject to any disclaimer, the term of this patent is extended or adjusted under 35 U.S.C. 154(b) by 373 days.

(21) Appl. No.: 11/041,520

(22) Filed: Jan. 24, 2005

(65) Prior Publication Data

US 2005/0234344 A1    Oct. 20, 2005

Related U.S. Application Data

(60) Provisional application No. 60/544,468, filed on Feb. 13, 2004.

(51) Int. Cl.
*G01B 11/14* (2006.01)
(52) U.S. Cl. ........................... 356/614; 356/622
(58) Field of Classification Search ......... 356/614–623
See application file for complete search history.

(56) References Cited

U.S. PATENT DOCUMENTS 3,692,414 A    9/1972  Hosterman et al. ............ 356/1
4,136,949 A    1/1979  Hayamizu et al. .......... 356/167
4,744,664 A *  5/1988  Offt et al. .................... 356/615
5,841,539 A * 11/1998  Ikurumi et al. ............. 356/613

FOREIGN PATENT DOCUMENTS

DE          41 02 404          7/1992

\* cited by examiner

*Primary Examiner*—Hoa Q. Pham
(74) *Attorney, Agent, or Firm*—Bromberg & Sunstein LLP

(57) ABSTRACT

An apparatus and method for digitization of surfaces of complex objects such as dental surfaces or plastic parts. While an object is being scanned by translation along a known trajectory, typically in a plane, the line of sight of a distance probe is bent toward an object by a periodic series of reflecting surfaces characterized by normal vectors at distinct non-orthogonal angles with respect to their axis of symmetry. One or more reference objects are scanned using the same translation and mirror positioning systems. Gathered coordinate data are processed to apply angular corrections and combined to form a single distortion-corrected image.

12 Claims, 6 Drawing Sheets

DIGITIZATION OF UNDERCUT SURFACES USING NON-CONTACT SENSORS

The present invention application claims priority from U.S. Provisional Patent Application Ser. No. 60/544,468, filed Feb. 13, 2004, and incorporated herein by reference.

FIELD OF THE INVENTION

The present invention relates to non-contacting metrology, and, in particular, to an apparatus and methods for optical scanning and digitizing the coordinates of a solid body of complex shape.

BACKGROUND ART

Coordinate measuring machines (CMMs) are employed to determine the coordinates, in some specified frame of reference, of points on the surface of a workpiece. CMMs are typically employed for digitizing or imaging, whether for replicating a prototype, for example, or for various manufacturing applications. The salient parts of a CMM include a stage, or complex of stages, for moving the object to be characterized, a probe for measuring the distance to a point on the surface relative to a fiducial position, a control or computing system, and measurement software for converting the measurement into a meaningful format for the intended application.

Various probes may be employed for measuring a distance to the surface of the measured workpiece. Any probe, currently known or otherwise, is within the scope of the present invention.

One form of probe, typified by the ConoProbe™ supplied by Optimet, Optical Metrology Ltd. of Jerusalem, Israel, employs conoscopy, a form of holography. Conoscopy is an interferometric technique capable of determining the distance to one or more points on an object surface without employing a reference beam. Instead, light emanating from a source region is prepared in a defined state of polarization and then passed through an anisotropic optical element in which one polarization suffers phase retardation with respect to the other. The two polarization components emerging from the anisotropic optical element interfere with one another, producing a interferogram in the detector plane. Conoscopy is the subject of various patents, including U.S. Pat. Nos. 4,602,844, 4,976,504, 5,081,540, 5,081,541, and 5,953,137, all of which patents are incorporated herein by reference.

One limitation imposed by existing CMMs is due to the fact that even the most versatile optical sensors are unable to digitize on vertical or very steep angles measured with respect to the optical axis (or 'line of sight') of the probe. 'Vertical', in this case, refers to the surface of the scanned body lying parallel to the optical axis of the probe. An 'undercut' refers to a negative angle relative to the line of sight. Some applications, however, such as dental surface profiling for purposes of reconstruction, orthodontics, etc., as well as digitization of plastic parts, molds, etc., require measurements on vertical walls or low angle undercuts.

As used herein, a body characterized as 'complex' is one having vertical walls or low angle undercuts. Using prior art technology, scanning a complex body requires orthogonal scanning the object about multiple (typically 5) axes. As used herein, 'orthogonal scanning' refers to scanning of the line of sight of a probe entirely within a single plane normal to an axis of rotation. This method, while algorithmically simple, requires very large travel on the scanning stages making the equipment very expensive.

Another prior art solution to the problem of small (or zero, or negative) angles with respect to the probe line of sight is to perform non orthogonal scanning by using a 2-axis angular arm. In this case the whole sensor is rotated, and both the complex arm and the requisite large travel ranges add to the cost of such systems. Yet another prior art solution for scanning complex bodies requires changing the sample position to allow direct line of sight for each feature. In this case very complex reconstruction software is required to merge the individual scans by 'best fit' of complex surfaces. The results of the 'stitch' depend on the quality of the data, size and shape of common features used for reference and the robustness of the algorithms. Typically, operator intervention is required, both during the scanning (otherwise 2 or more motorized axis are required on the sample fixture) and during data processing. In some cases like dental applications or plastic parts with smooth surface features it is very difficult to find the right fit and reference items to register successive 'views' of the object. One solution is to 'glue' registration features ('balls') to the sample.

Clearly, an automated and robust solution to the problem of digitizing complex bodies is desirable.

SUMMARY OF THE INVENTION

In accordance with a preferred embodiment of the present invention, there is provided an apparatus for non-contact characterization of a surface of a body. The apparatus has a stage for controlled translation of the body in at least one direction, a non-contact sensor characterized by a line of sight for measuring a distance from a specified point on the surface of a body to a fiducial reference position, and a carousel having a plurality of reflectors for varying the line of sight of the non-contact sensor with respect to a specified plane in a periodic manner.

In accordance with alternate embodiments of the invention, the carousel may be adapted for rotation about one or more axes. The stage may be capable of translation along orthogonal axes, or may also be capable of rotation about a specified axis. The non-contact sensor may, more particularly, be a conoscopic probe.

In yet further embodiments of the invention, the apparatus also has a processor for receiving the signal corresponding to the distance measured by the non-contact sensor at the plurality of points in time and for reconstructing the surface of the body in a frame of reference fixed with respect to the body.

Additionally, the invention provides a method for non-contact characterization of a surface of a body. The method has steps of:
a. supporting the body on a stage;
b. translating the body in at least one direction;
c. characterizing distances from the surface of the body with respect to a fiducial reference along periodic sequence of distinct lines of sight; and
d. merging the distances to form an image of the surface of the body.

The method may have an additional step of transforming each of the distances to a common frame of reference. The step of characterizing distances may include measuring the distances, and scanning the body with a beam and with scanning performed in non-orthogonal directions. Characterizing the distances may also include measuring distances along a line of sight that varies periodically with time, and scanning the body with a beam of light reflected from mirrors disposed upon a rotating carousel.

The coordinates of reference objects of known shape may also be determined in conjunction with translation of the body; and the distances determined with respect to the reference objects may be used to infer accurate mirror positions for image construction and correction of distortion.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

In preferred embodiments of the invention, a simple X-Y scanning system is advantageously combined with a non contact sensor characterized by an optical axis (or line of sight) and a variable position mirror that varies the line of sight with respect to a scanned body in a manner advantageously suited to automatic digitization of complex bodies.

Figure 1:
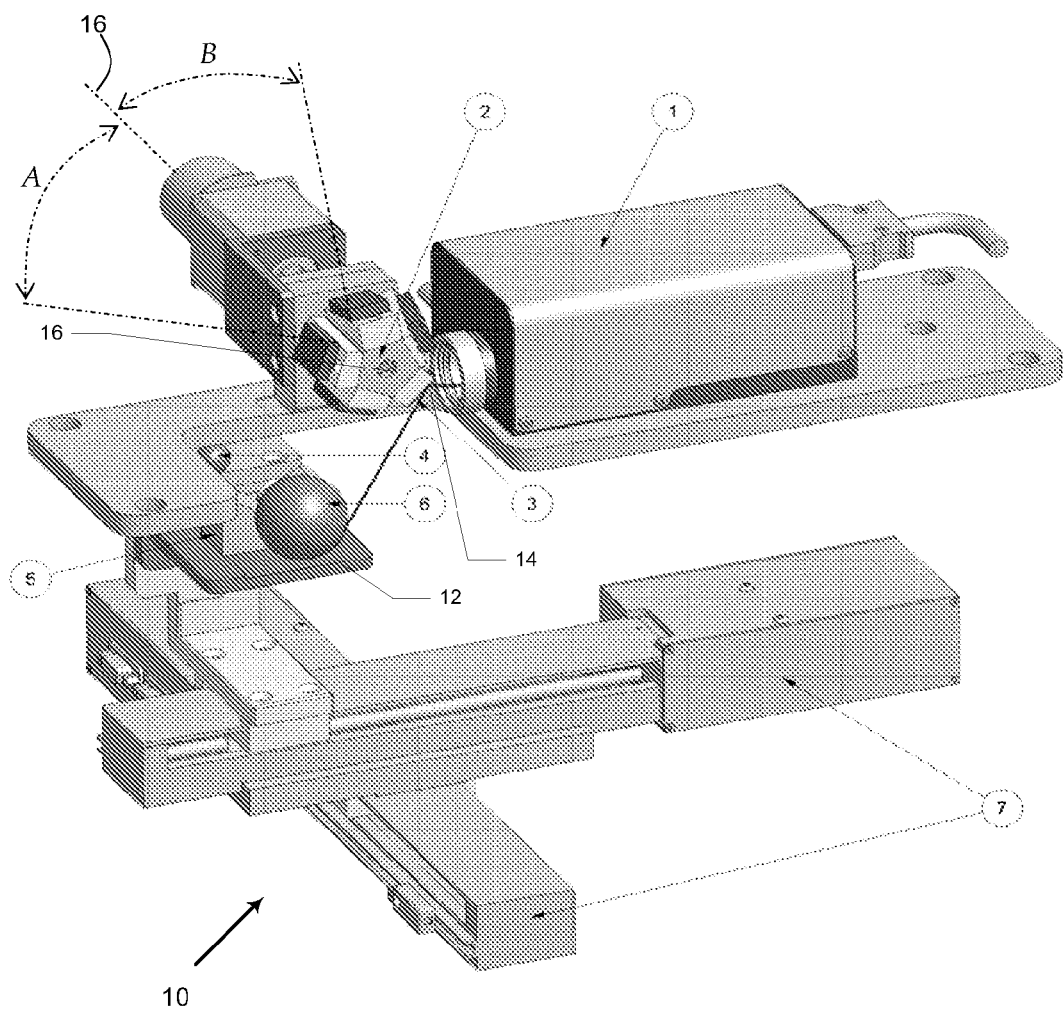
FIG. 1 is a cutaway view of a multiple angle scanning system depicting the scanning of a spherical object in accordance with embodiment of the present invention.

Referring, first, to FIG. 1, a perspective view is shown of the salient components of a scanning system in accordance with preferred embodiments of the present invention. An object 6 to be measured, here represented by a sphere, is disposed on carriage 12 of a coordinate measuring machine, designated generally by numeral 10. Reference bodies may also be disposed on carriage 12 (also referred to as a 'support') so as to travel in synchrony with object 6 as it is translated by the carriage. Two reference bodies are shown in FIG. 1: a reference sphere 4 and an angular reference V prism 5. Carriage 12 may be translated, along orthogonal axes, as by means of orthogonal X-Y translation stages 7, however all means of translating object 6 during the course of scanning is within the scope of the present invention. Other means of moving carriage 12 along a known trajectory include motion along a vertical (Z) axis and rotation about one or more specified axes.

A distance probe 1 is typically characterized by an optical axis or line of sight, designated, in FIG. 1, by the line denoted by numeral 14. In preferred embodiments of the invention, a laser beam is emitted collinearly with optical axis 14 of the distance probe. Distance probe 1 is a non-contact sensor such as a conoscopic sensor, or any other distance probe.

Line of sight 14, and the laser beam coaligned with it, is bent by one or more folding mirrors 3 so that the line of sight impinges upon the surface of scanned body 6. It is to be understood that the optical path shown is described for purposes of convenience and that more complex optical paths, entailing any other optical elements, are within the scope of the present invention and described herein and as claimed in any appended claims.

In accordance with preferred embodiments of the invention, a plurality of folding mirrors 3 are mounted on a multi-position actuator 2 in such a way to allow laser beam bending in different directions. Multi-position actuator 2 may be a carousel supporting multiple mirrors that is rotated about a central axis 16. More particularly, mirrors 3 may be mounted on a polygon, such as the pentagon shown in FIG. 1. Mirrors 3 may be reflecting surfaces fashioned in the carousel in a continuous or discontinuous sequence of normal directions. The mirrors may also be mounted in preset positions, as shown in FIG. 1. The normal directions of successive reflecting surfaces are disposed at varying angles with respect to the plane normal to the axis of rotation of multi-position actuator 2. Such disposition of reflective surfaces on the actuator 2 in FIG. 1 is illustrated by unequal angles A and B between the respective normals to the reflective surfaces of two adjacent mirrors 3 and the central axis 16. Thus, as the actuator is rotated, the line of sight of the distance probe does not sweep out a plane but varies over a range of angles, typically on the order of ±20° with respect to the orthogonal plane.

Measurements of distances to the surface of body 6 along line of sight 14 are collected and processed separately for each of the mirrors 3, thus forming a distinct 'cloud' of points attributable to that mirror. Merger (or 'stitching') of the respective clouds of points to form a single consistent image is discussed below.

In the case where mirrors 3 are disposed at preset angles, after assembly an accurate measurement of each bending angle is performed for each position of the actuator. The measured angle values are transferred to the software and used for the coordinate transformation from a coordinate system based on motion of the scanning system 7 to an orthogonal coordinate system. (Since the line of sight is incident onto the surface of the object at an angle that is specific to each mirror position, a separate coordinate system attaches to each position of the mirror until coordinates are transformed to an orthogonal system.

Desired bending angles may be calculated for a particular application in order to cover the desired undercut angle and leave enough working range. Mirrors 3 may then be set accordingly. High bending angles will reduce the actual working range relative to vertical position and require larger travel for the moving stages.

It is to be noted that the main scanning movement (typically X-Y) may be performed either by the measured object and reference samples fixed on a mounting table or, as a matter of design choice, by the sensor mounted together with the folding mirrors on a common support. Both equivalent motions are within the scope of the present invention.

Data from the measurements described herein are advantageously gathered and processed automatically and without human intervention. In order to increase accuracy of measurement, a fixed reference object (sphere 4, V prism 5) is scanned before the part is scanned, enabling an accurate evaluation of the beam position relative to the X-Y scanning system 7.

All the gathered data for each mirror position is processed first by applying the angular correction for the profiles to orthogonal coordinates and then an origin shift, using the spherical fit to translate the local coordinates to the same origin in a frame of reference fixed with respect to the body. Since the measured object 6 remains fixed (relative to the mounting device, carriage 12) for the entire measurement cycle, the actual X, Y coordinates of each point are the same for all beam positions, thus simple robust mathematical methods are advantageously employed for data processing in a totally automatic cycle.

Figure 2:
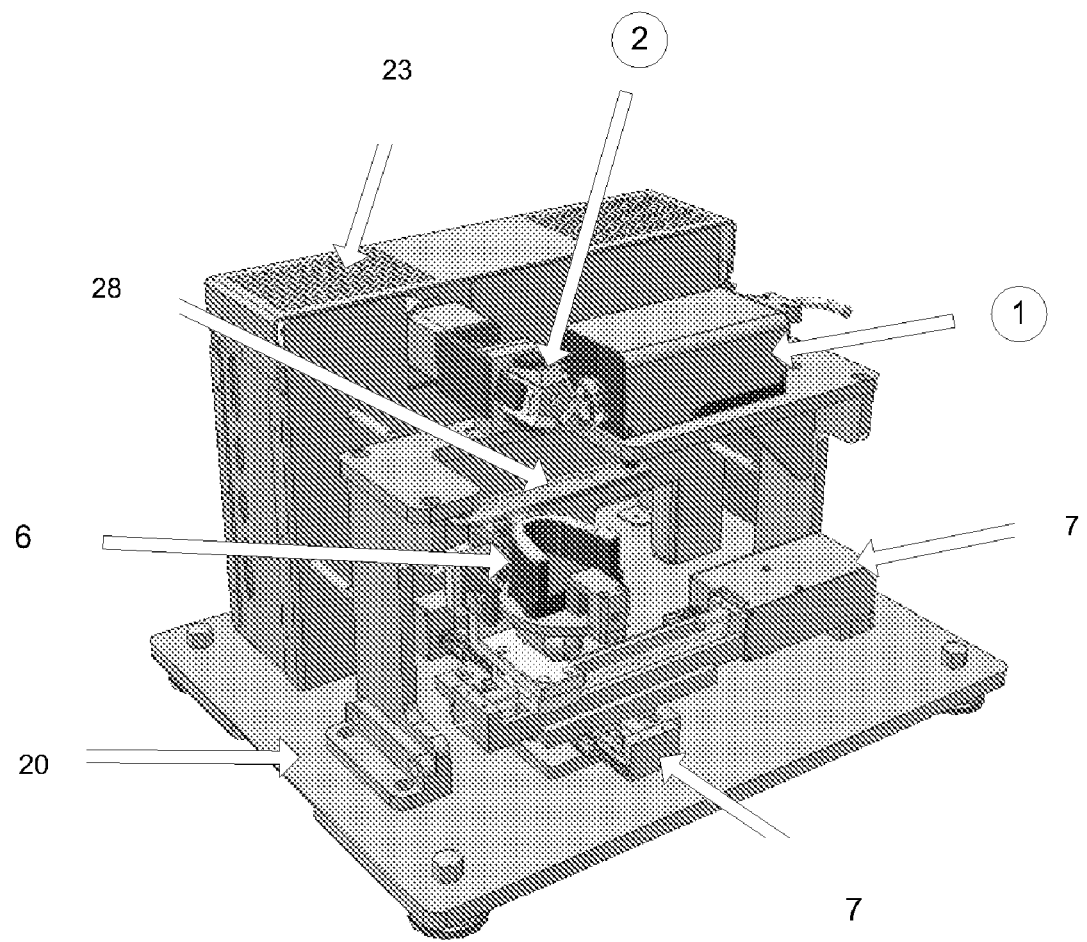
FIG. 2 is a perspective view of a multiple angle scanning system for dental applications, in accordance with a further embodiment of the present invention.

Referring now to FIG. 2, a coordinate measuring employing embodiment of the present invention is shown, with components labeled as described above with reference to FIG. 1. The scanned object 6 in this case is a dental mold. Also shown are base 20 and controller box 23 containing a processor for control of motion of stage actuators 7 and analysis of clouds of points from each mirror position and merger of the separate clouds into one single cloud that reflects the actual shape of the 3D object.

The apparatus and methods described herein are advantageously applied to collinear, non-contact measurement sensors that require simple, trigonometric based transformation algorithms. A complete or partial reconstruction of a 3D object may be derived, 360 degrees of a sphere with a 3-axis X, Y, Z/rotating axis and one axis mirror drive or X-Y system and 2 axis mirror drive, or 270 degrees of a sphere with a 2 axis X-Y and one axis mirror drive.

In accordance with alternate embodiments of the invention, non-orthogonal scanning with non contact sensor may be applied to common X-Y CMM scanning machines, with optional Z translation or rotation about specified axes.

Figure 3A:
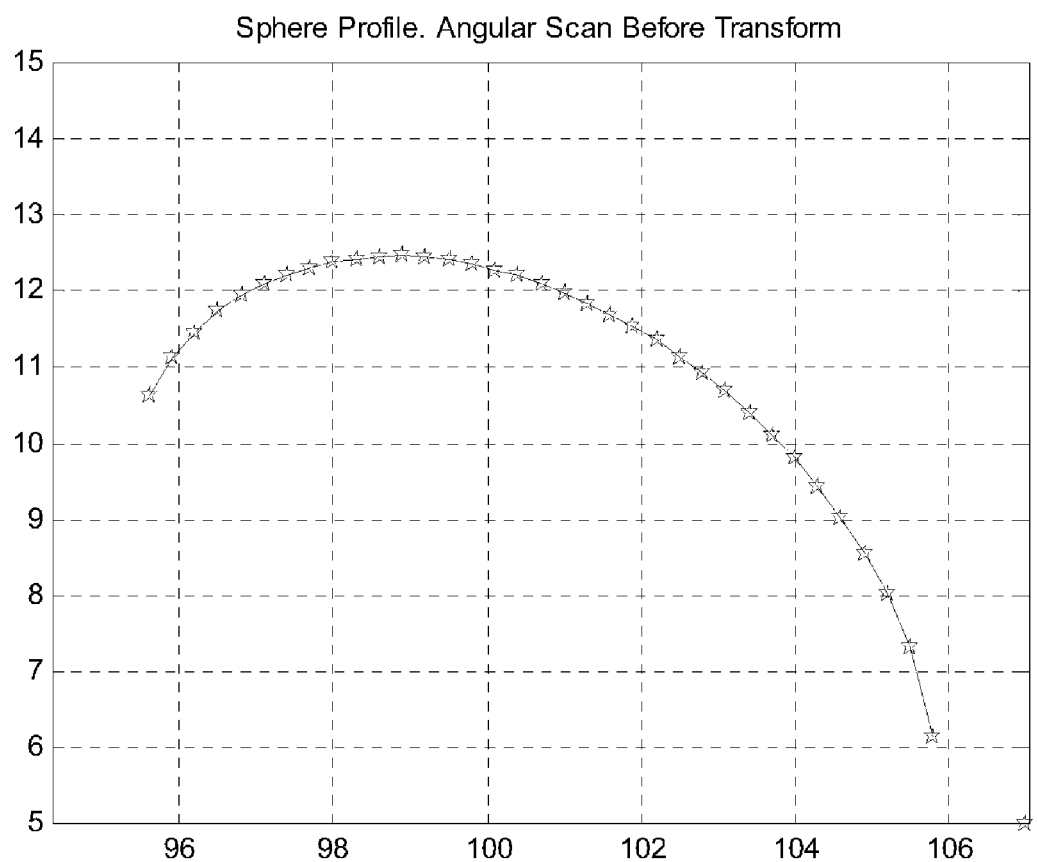
FIG. 3A shows a circular profile (sphere/cylinder) as measured in non orthogonal coordinates (laser beam bent normal to main scanning direction) and FIG. 3B shows the profile of FIG. 3A after transformation to orthogonal coordinates.
Figure 3B:
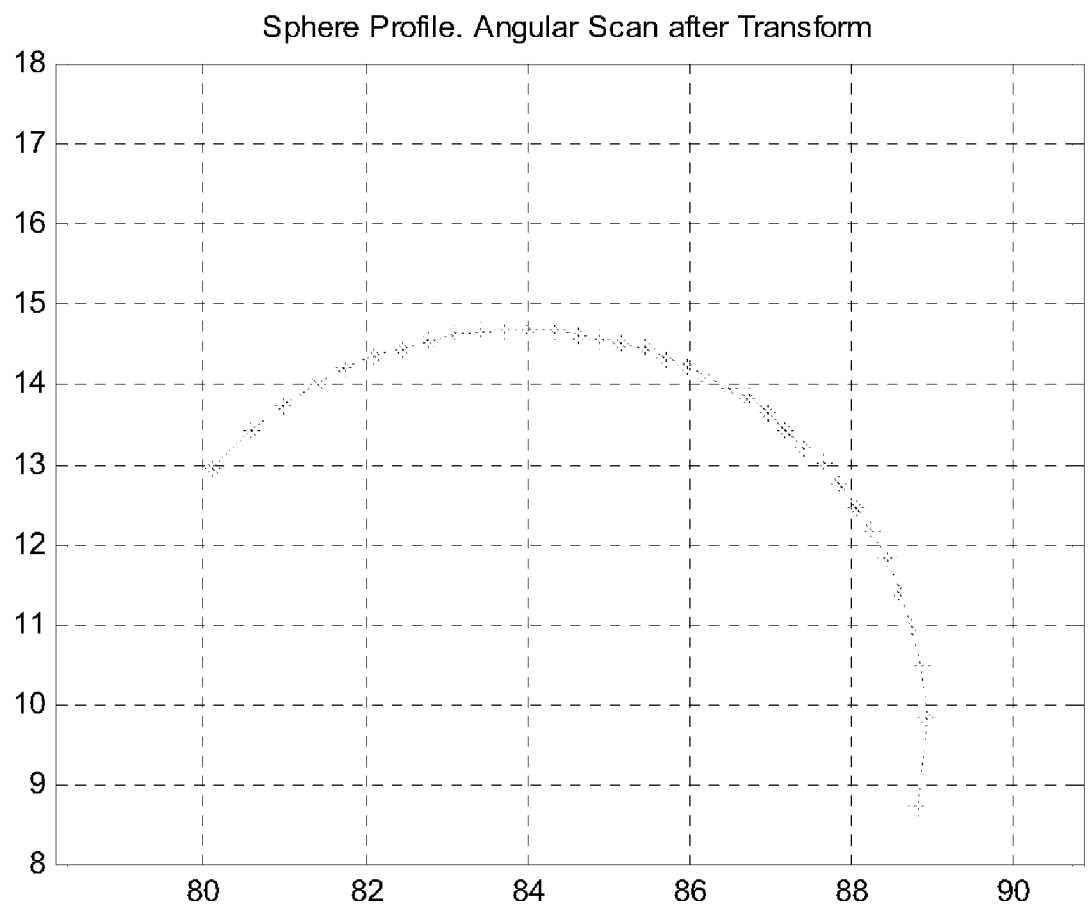

After setup in which sample borders are defined in software, data gathering proceeds automatically. Trigonometric matrix transformations of the non orthogonal coordinates and a sphere fit provide for relative coordinate origin translation, transforming the raw data of FIG. 3A to the spherical fit of FIG. 3B.

Figure 4:
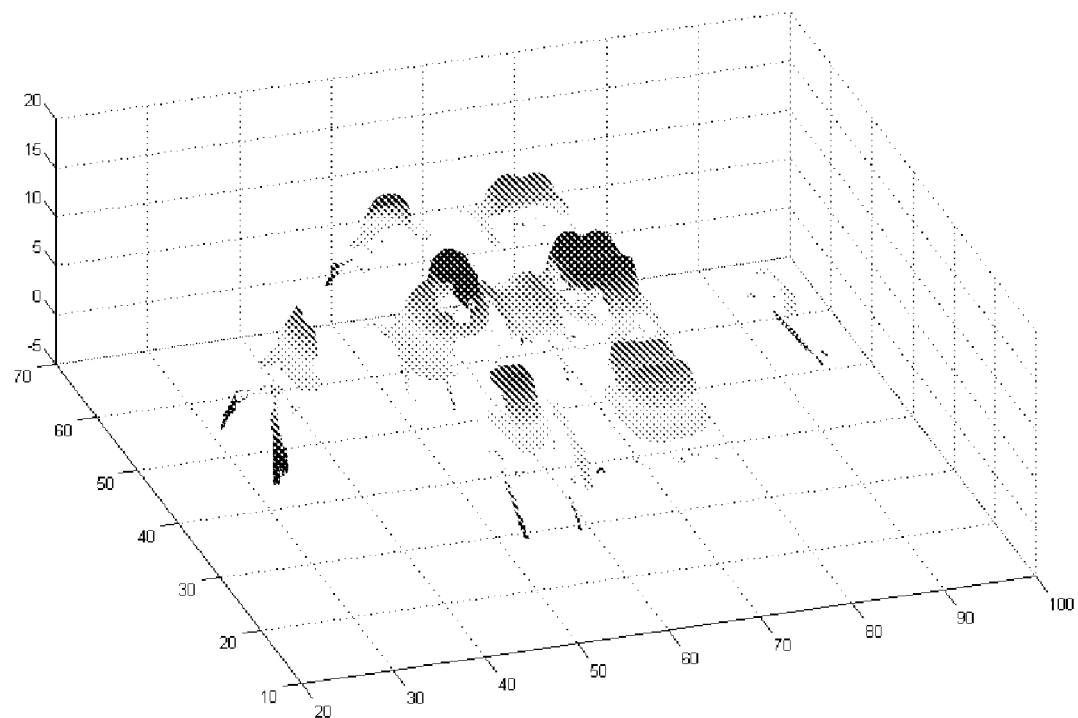
FIG. 4 shows an image derived from 5 different surface scans taken with 5 mirror positions after profile reconstruction in accordance with embodiments of the present invention.
Figure 5:
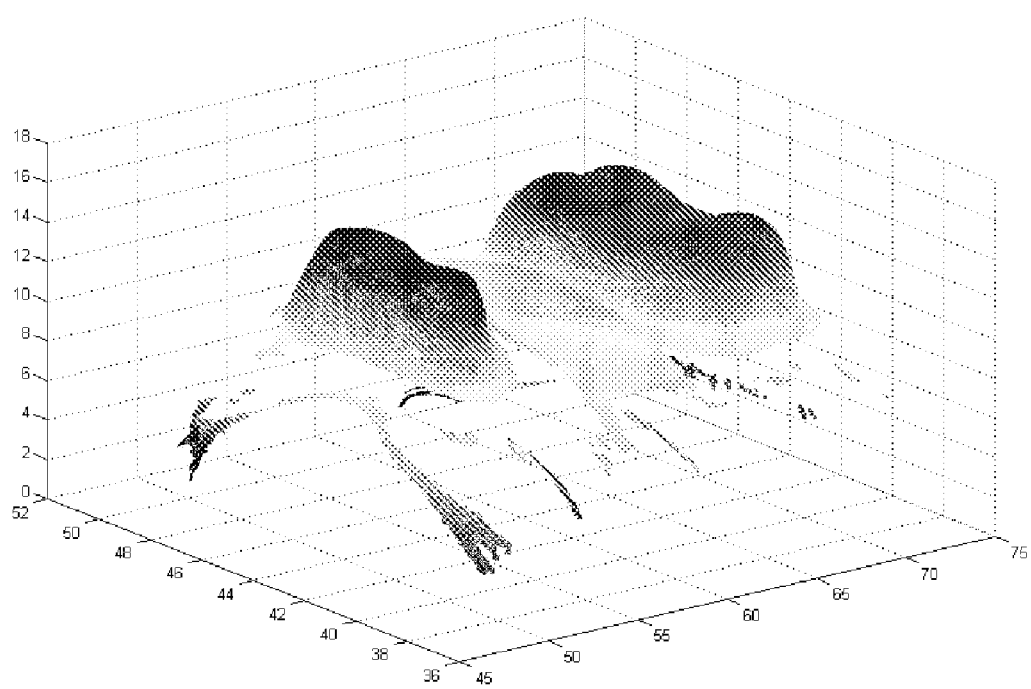
FIG. 5 is a depiction of the scans shown in FIG. 4 after coordinates translation using sphere fit (of the reference sphere) for the translation.

Point clouds due to distinct partial scans, as shown in FIG. 4, are merged, after coordinate transformation and translation to the merged point cloud shown in FIG. 5.

The described embodiments of the inventions are intended to be merely exemplary and numerous variations and modifications will be apparent to those skilled in the art. All such variations and modifications are intended to be within the scope of the present invention as defined in the appended claims.

What is claimed is:

1. An apparatus for non-contact characterization of a surface of a body, the apparatus comprising:
   a. a stage for controlled translation of the body in at least one direction;
   b. a non-contact sensor characterized by a line of sight for measuring, at a plurality of points in time, a distance from a specified point on the surface of a body to a fiducial reference position and for generating a signal characterizing the distance; and
   c. a carousel characterized by an axis of rotation, the carousel having a plurality of reflecting surfaces for varying the line of sight of the non-contact sensor with respect to a specified plane in a periodic manner, the plurality of reflecting surfaces disposed at unequal angles with respect to the axis of rotation.

2. An apparatus in accordance with claim 1, wherein the stage is capable of translation along orthogonal axes.

3. An apparatus in accordance with claim 1, wherein the stage is capable of rotation about a specified axis.

4. An apparatus in accordance with claim 1, wherein the non-contact sensor is a conoscopic probe.

5. An apparatus in accordance with claim 1, further comprising a processor for receiving the signal corresponding to the distance measured by the non-contact sensor at the plurality of points in time and for reconstructing the surface of the body in a frame of reference fixed with respect to the body.

6. A method for non-contact characterization of a surface of a body, the method comprising:
   a. supporting the body on a stage;
   b. translating the body in at least one direction;
   c. characterizing distances from the surface of the body to a fiducial reference along a periodic sequence of distinct lines of sight, the lines of sight varying periodically in a direction parallel to a specified plane while changing concurrently in a direction perpendicular to the specified plane; and
   d. merging the distances to form an image of the surface of the body.

7. A method in accordance with claim 6, further comprising: characterizing distances to reference objects of known shape in conjunction with translation of the body.

8. A method in accordance with claim 6, further comprising: transforming each of the distances to a common frame of reference.

9. A method in accordance with claim 6, wherein the step of characterizing includes measuring the distances.

10. A method in accordance with claim 6, wherein the step of characterizing distances from the surface of the body to a fiducial reference includes scanning the body with a beam and with scanning performed in non-orthogonal directions.

11. A method in accordance with claim 6, wherein the step of characterizing distances from the surface of the body to a fiducial reference includes measuring distances along a line of sight that varies periodically with time.

12. A method in accordance with claim 6, wherein the step of characterizing distances from the surface of the body to a fiducial reference includes scanning the body with a beam of light reflected from mirrors disposed upon a rotating carousel.

* * * * *